Sept. 4, 1945.  V. KINSER  2,383,974
TRANSMISSION
Filed April 14, 1943   2 Sheets-Sheet 2
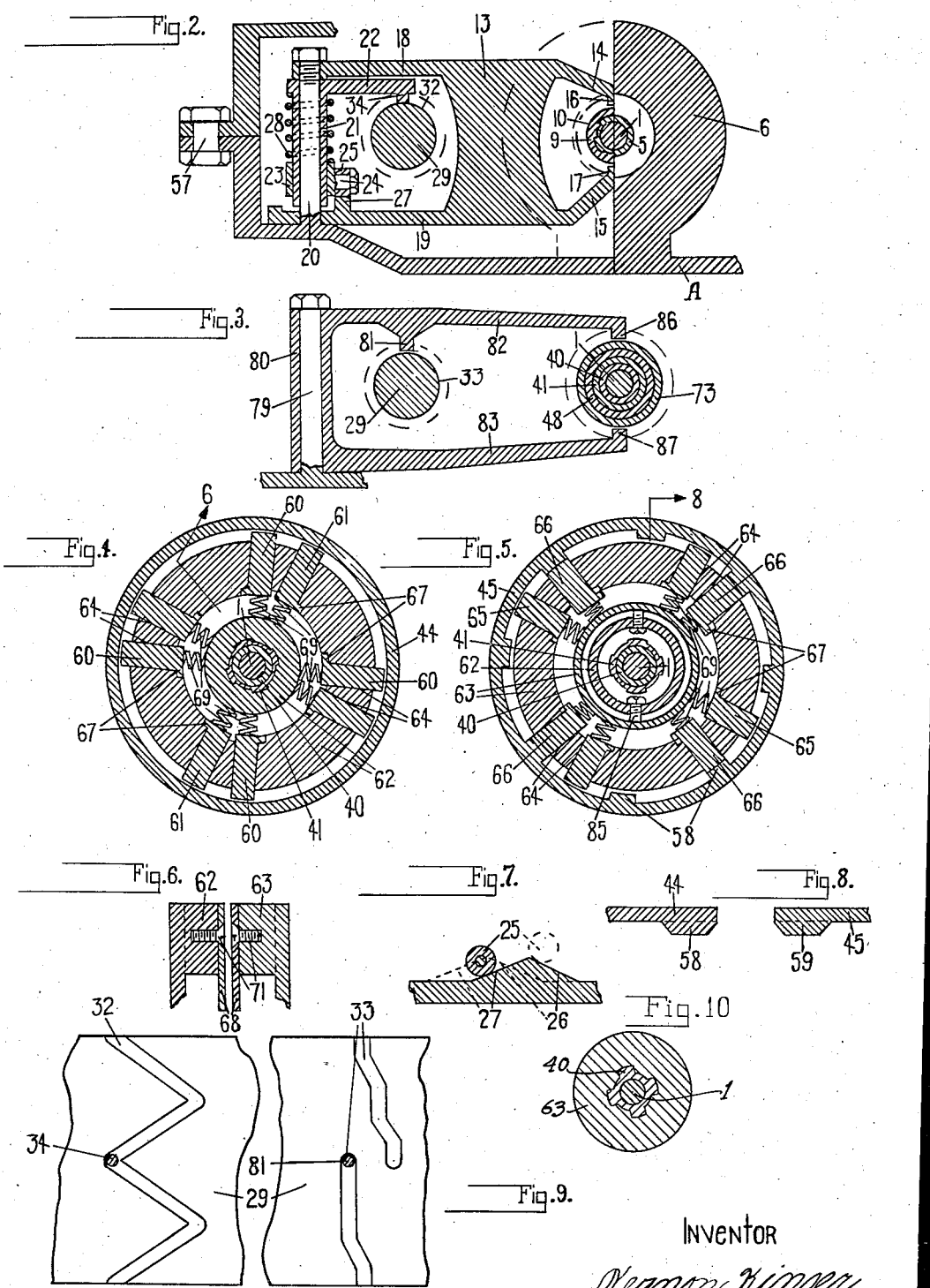

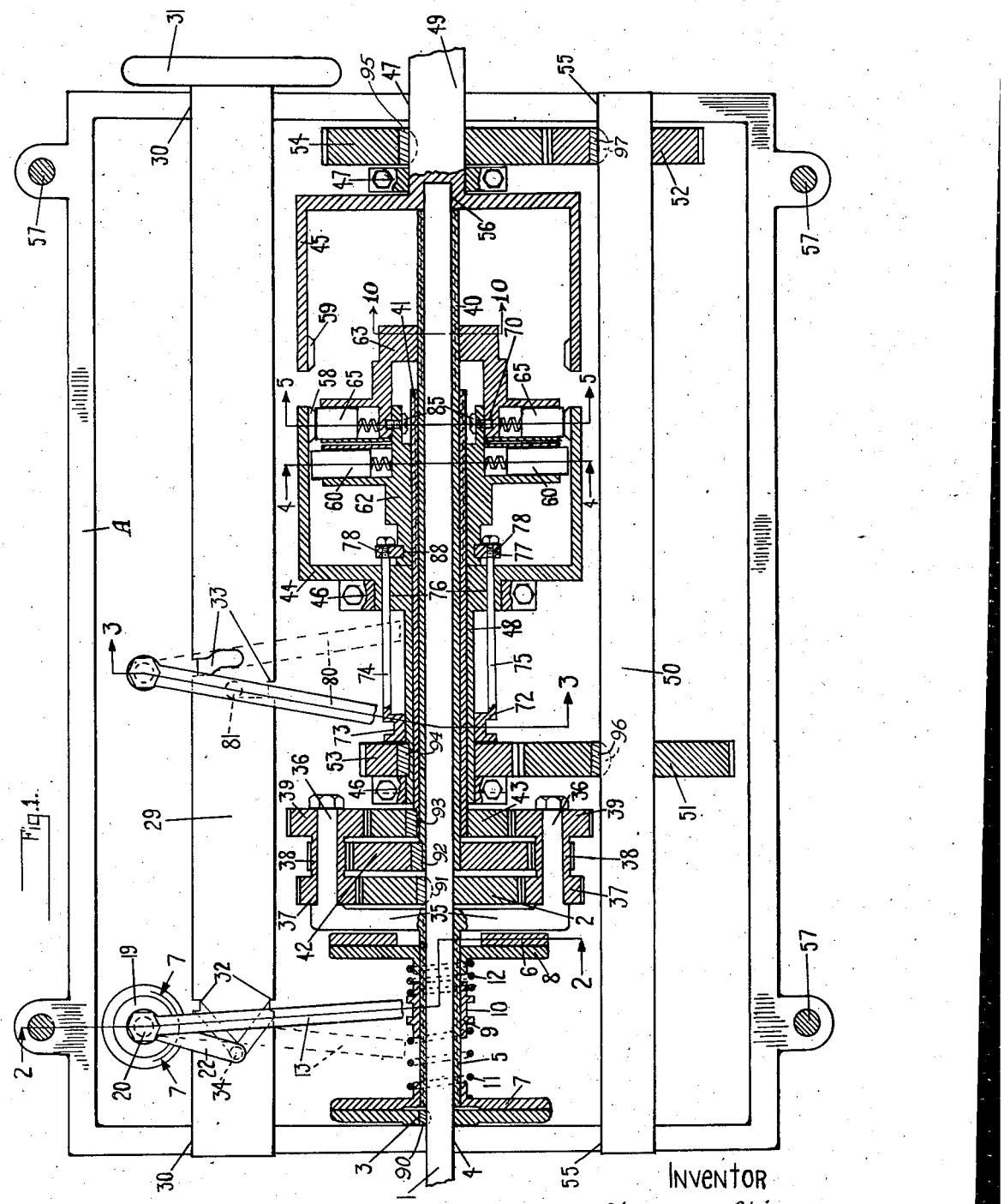

Patented Sept. 4, 1945

2,383,974

UNITED STATES PATENT OFFICE 2,383,974

TRANSMISSION

Vernon Kinser, Detroit, Mich.

Application April 14, 1943, Serial No. 483,067

7 Claims. (Cl. 74—279)

This invention relates generally to speed transmission, and has more particular reference to speed transmissions of variable type.

My invention has for its prime objects the provision of a transmission having a substantial number of different speeds between predetermined limits; the provision, in such apparatus, of means whereby the speed changing elements operate repeatedly between their speed changing limits, carrying greatly reduced torque, to effect the desired overall speed changes; the provision of speed changing mechanism, of the kind described, in which torque-transmission is effected to a large extent by gears or other positive drives with a mere minimum of power being transmitted by the speed changing elements, and, in general to improve the construction of transmissions now being used in tractors, automobiles, other vehicles, and various industrial applications.

And with the above and other objects in view, my invention resides in the novel features of form, construction, arrangement, and combination of parts hereinafter described and pointed out in the claims.

In the accompanying drawings—

Figure 1 is a longitudinal sectional view through a variable speed transmission of my invention;

Figures 2, 3, 4 and 5 are transverse sectional views of the unit, taken respectively on the line 2—2, 3—3, 4—4 and 5—5 on Figure 1;

Figure 6 is a fragmentary transverse part sectional view taken approximately at the line 6, Figure 4.

Figure 7 is a sectional view taken approximately along the circumference 7—7, Figure 1;

Figure 8 is a fragmentary sectional view taken approximately along the line 8, Figure 5;

Figure 9 is a view taken along the circumference of the cam shaft 29 showing a full 360 degrees; and Figure 10 is a sectional view taken approximately along the line 10—10, Figure 1, showing the shifting collar 63, the sleeve 40, and the drive shaft 1.

Referring now more in detail and by reference characters to the drawings, which illustrate a preferred embodiment of my invention, 1 designates the drive shaft of the transmission, being rigidly affixed to a sun gear 2 by means of the key 91 and likewise rigidly affixed to a clutching member 3 by means of the key 90. The drive shaft 1 is supported on one end by the bearing 4 provided in the housing A of the transmission. Revolvably mounted upon the drive shaft 1 is the revolvable member or sleeve 5, best seen in Figure 1.

Means are provided for varying the speed of the sleeve 5 with respect to the drive shaft 1, preferably, as in this instance, by means of suitable clutching and braking means whereby the sleeve 5 is alternately either driven by the drive shaft 1 or restrained against rotation.

For restraining the sleeve 5 against rotation there is provided as an integral part of the housing A the stationary braking member 6 disposed oppositely with respect to the clutching member 3 for purposes now appearing. Interposed between the clutching member 3 and the braking member 6 is the corresponding pair of complementary friction members 7, 8 being splined to the sleeve 5 and disposed for cooperation respectively with the clutching member 3 and the braking member 6, all of which is best seen in Figure 1.

Disposed between the friction members 7, 8 is the pair of springs 11, 12 on either side of a suitable shifting collar 9 which is splined to the sleeve 5 and provided with a circumferential groove 10. It may be well to here say that the springs 11, 12 are of suitable length so as to permit alternate operation of the friction members 7, 8 by and with the shifting collar 9.

Provided in the housing A is the link 13 which includes a pair of arms 14, 15 being equipped respectively with the studs 16, 17 disposed for operative engagement with the groove 10 of the shifting collar 9. Included likewise as part of the link 13 are the arms 18, 19 extending in an opposite direction with respect to the arms 14, 15 and being swingably connected to the housing A by means of an integral stud bolt 20. The arm 19 is provided with the cam faces 26, 27, circumferentially axially disposed with respect to the axis of the stud bolt 20, and being oppositely disposed with respect to each other, best seen in Figures 2 and 7.

Embracing the stud bolt 20 between the pair of arms 18, 19 is the sleeve 21 which on one end is provided with an arm 22. The arm 22 terminates in an integral stud 34. Splined to the sleeve 21 is the cam follower member 23 being equipped with a suitable trunnion 24 upon which is mounted the roller 25 disposed for operative engagement with one or the other of the cam faces 26, 27.

The roller 25 is caused to be yieldingly held against either the cam face 26 or 27 by means of a suitable compression spring 28 being disposed between the cam follower member 23 and the arm 22. When the roller 25 is in contact with the cam face 26 the link 13 will be caused to shift the shifting collar 9 for compression of the spring 11 for cooperation between the friction member 7 and the clutching member 3 for unison speed response of the sleeve 5 to the drive shaft 1. The spring 28, it will be understood, has compression enough to cause the roller 25 being forced against the cam face 26 or 27 to operate the shifting collar 9 for complete compression of either the spring 11 or 12.

Similarly, when the roller 25 is in contact with the cam face 27 the shifting collar 9 will be caused to compress the spring 12, the spring 11 will be released of its tension, the friction member 8 will cooperate with the braking member 6, and the sleeve 5 will be effectively restrained against rotation.

Rotatably mounted in the housing A is the cam shaft 29 supported by the bearings 30 and provided at one end with a control wheel 31. The periphery of the cam shaft 29 is interrupted to provide a pair of circumferential grooves 32, 33, the groove 32 being disposed for operative engagement with the stud 34 of the arm 22 of the link 13.

The groove 32 is disposed with a profile arranged to cause the arm 22 to oscillate for, in turn, shifting of the roller 25 from one of the cam faces 26 or 27 to the other so that one full turn of the control wheel 31 will cause the roller 25 to be shifted from the cam face 27, as shown in Figure 7, to the cam face 26 at one quarter turn of the control wheel 31, then the roller 25 will be shifted back to the cam face 27 at half turn of the control wheel 31. At three quarters turn of the control wheel 31 the roller 25 will be forced upon the cam face 26 and at one full turn of the control wheel 31 the roller 25 is forced back to the cam face 27.

It may be well to here say that such shifting of the roller 25 from one of the cam faces 26 or 27 to the other by the cam shaft 29 will result in a corresponding movement of the shifting collar 9, as has been hereinbefore set forth. So that as the control wheel 31 is rotated the friction members 7, 8 are alternately operated, first, for cooperation of the friction member 8 with the braking member 6 for restraining the sleeve 5 against rotation, then, for cooperation of the friction member 7 with the clutching member 3 for unison speed response of the sleeve 5 to the drive shaft and so on, for varying the speed of the sleeve 5.

Radially extending from the sleeve 5 is the pair of arms 35 each being equipped at their outer ends with suitable trunnions 36 axially disposed with respect to the sleeve 5. Mounted on the trunnions 36 is the respective pairs of planetary pinions 37, 38, 39, the different pairs of pinions 37, 38, 39 being arranged in cluster gear fashion or integrally disposed with respect to each other, as best seen in Figure 1.

Mounted on the drive shaft 1 is the pair of revolvable members or sleeves 40, 41. The sleeves 40, 41 are respectively rigidly affixed to a pair of sun gears 42, 43 by means of the keys 92, 93, respectively; and are disposed for operative engagement respectively with the planetary pinions 38, 39. The planetary pinions 37 are in meshing engagement with the sun gear 2.

Power is transmitted from the sleeve 5 and the drive shaft 1 to the sleeves 40, 41 by means of the planetary gearing arrangement which includes the sun gears 2, 42, 43 and the planetary pinions 37, 38, 39. Referring to Figure 1 it will be noted that the planetary pinions 38 are smaller than the planetary pinions 37, while the planetary pinions 39 are larger than the planetary pinions 37. Because of this difference in size or pitch line diameter of the planetary pinions 37, 38, 39, will result in a corresponding difference in size of the sun gears 2, 42, 43.

Because of such differences in the pitch line diameters of the planetary pinions 37, 38, 39, rotation of the sleeve 5 in either direction with respect to the drive shaft 1 will cause the sleeves 40, 41 to rotate in opposite directions with respect to the drive shaft 1. Upon rotation of the sleeve 5 in either direction with respect to the drive shaft 1, the gear 42 will rotate at a speed intermediate with respect to the gear 2 and the sleeve 5, since the planetary pinions 37, 38 are disposed to rotate at the same speeds with respect to each other, and, because of the difference in the size of the planetary pinions 37, 38 the gear 42 must rotate at a speed nearer the same speed of the sleeve 5 than the gear 2.

Such an intermediate speed of the gear 43, however, will not be effected, instead, the gear 2 will be caused to rotate at a speed intermediate with respect to the sleeve 5 and the gear 43, since the planetary pinions 37 are smaller than the planetary pinions 39 and the gear 2 must rotate at a speed nearer the same speed of the sleeve than the gear 43.

Thus, it will be seen, with the gear 2 rotating at a speed intermediate with respect to the sleeve 5 and the gear 43, and the gear 42 rotating at a speed intermediate with respect to the gear 2 and the sleeve 5; rotation of the sleeves 40, 41 must, hence, be in reverse or opposite directions with respect to each other or the drive shaft 1, whenever, for any reason the sleeve 5 is rotated in either direction with respect to the drive shaft 1.

Adjacent the gear 43, coaxially disposed with respect to the drive shaft 1, is the pair of opposing drums 44, 45, the drum 44 being journaled by means of the bearings 46 embracing the sleeve 48 which extends axially from the drum 44. The drum 45 is likewise mounted on the bearings 47 by means of the driven shaft 49, axially extending from the drum 45 for connecting to the rear wheels of an automobile or some driven machine as the case may be.

Means are provided for connecting the drums 44, 45 to the driven shaft 49 for rotation of the drums 44, 45 at different speeds with respect to each other. For which purpose is provided an idler shaft 50 upon which is rigidly affixed a pair of gears 51, 52 by means of respective keys 96, 97, the gears 51, 52 being disposed for respective operative engagement with the gears 53, 54. The gears 53, 54 are rigidly affixed to the sleeve 48 and the driven shaft 49, respectively, by means of the keys 94, 95, also respectively, the ratio between the gears 51, 53 and the gears 52, 54 being arranged so that the drum 44 will rotate at a faster speed with respect to the driven shaft 49 than the drum 45, which, in this instance, is integral with the driven shaft 49.

For rotarily supporting the idler shaft 50 by the housing A there is provided the bearings 55 suitably arranged at the ends of the idler shaft 50. The housing A is split so as to facilitate assembly of the parts and is provided with a suitable number of fastening elements or bolts 57, the split in the housing being arranged so as to provide accessibility to the bearings 4, 30, 55. The drive shaft is further supported by a pilot bearing 56 provided in the driven shaft 49.

Rotation of the sleeves 40, 41 with respect to the drive shaft 1 is effected, whenever, for any reason the sleeve 5 is caused to be held against rotation responsive to cooperation between the braking member 6 and the friction member 8. The sleeve 5 will be caused to rotate with respect to the drive shaft 1, the sleeve 40 will be caused to rotate at a speed intermediate with respect to the sleeve 5 and the drive shaft 1 or slower than the drive shaft 1, as has been described, and the sleeve 41 will rotate at a speed faster than the drive shaft 1 since rotation of the drive shaft 1 must be intermediate with respect to the speed of the sleeves 5, 41. It may be well to here say that the difference in speed between the sleeves 40, 41 caused by restraining the sleeve 5 against rotation corresponds to the difference in speed between the drums 44, 45.

Splined respectively to the sleeves 40, 41 is the pair of shifting collars 63, 62 arranged so as to be slidable axially with respect to the sleeves 40, 41, respectively. Radially disposed in each of the shifting collars 62, 63 is the grooves 64, the shifting collar 62 being equipped with two series of circumferentially spaced plungers 60, 61, slidably mounted in the grooves 64. Likewise the shifting collar 63 is equipped with the plungers 65, 66 circumferentially spaced with respect to each other. Each series of plungers 60, 61, 65, 66 is preferably four in number, as best seen in Figures 4 and 5.

Internally extending respectively from the drums 44, 45 is the sets of teeth 58, 59 being the same width as the ends of the plungers 60, 61, *5, 66. Referring to Figure 5 it will be noted that the teeth 58, 59 are spaced from each other in the circumference of the drum, a distance three times the width of the teeth 58, 59. The plungers 60, 61, 65, 66 are each provided with a catch as 67 for stopping movement thereof in a radial direction after they have come to a position for operative engagement with the teeth 58 or 59. Disposed between the plungers 60, 61, 65, 66 and the inner end of the grooves 64 are the springs 69 for yieldingly urging the plungers 60, 61, 65, 66 outwardly for operative engagement with the teeth 58, 59. The plungers 60, 61, 65, 66 are held in the grooves 64 by means of suitable washers as 68 being held to the shifting collar 62 or 63 by suitable fastening elements or screws 71, as best seen in Figure 6.

The sets of plungers 60, 61 or 65, 66 are circumferentially disposed with respect to each other so that when for any reason the shifting collar 62 or 63 is shifted for meshing engagement of the plungers 60, 61 or 65, 66 with the teeth 58 or 59, at least one of the sets of plungers 60, 61 or 65, 66 will be disposed for meshing engagement with the teeth 58 or 59, and are further disposed circumferentially with respect to each other so that the sets of plungers 60, 61 or 65, 66 are disposed for operative engagement with the teeth 58 or 59 in opposite directions with respect to each other.

As will be noted by referring to Figure 8, each of the sets of teeth 58, 59 are formed at an angle suitable so that either one of the sets of plungers 60, 61 or 65, 66 carried by the shifting collar 62 or 63 in being shifted laterally for meshing engagement with the teeth 58 or 59, will be caused to move inwardly against pressure of the springs 69, in case they are not circumferentially disposed with respect to the teeth 58 or 59 for meshing engagement therewith. It will be clear that in case either one of the sets of plungers 60, 61 or 65, 66 are forced inwardly caused by failure to mesh with the teeth 58 or 59, that the set of plungers 60, 61 or 65, 66, which does mesh with the teeth 58 or 59, will take up only one third of the actual space between the teeth 58 or 59, so that when driving engagement does occur between the shifting collar 62 or 63 and the teeth 58 or 59 that the other set of plungers 60, 61 or 65, 66 will, then be permitted to fall between the teeth 58 or 59 for meshing engagement therewith.

The shifting collars 62, 63 overlap and are connected to each other by means of a circumferential groove 70 provided in the shifting collar 63, a pair of threaded members or screws 85 being mounted in the shifting collar 62 and extending outwardly for operative engagement with the groove 70, whereby shifting collars 62, 63 are free to rotate with respect to each other but are not free for independent movement axially with respect to each other.

Mounted upon the sleeve 48 is the shifting collar 72 provided with the circumferential groove 73. Axially extending from the shifting collar 72 is a pair of integral stud bolts 74, 75 extending through the holes 76 in the drum 44. Provided in the shifting collar 62 is the circumferential groove 88 in which is mounted a suitable snap ring member 77 provided with the holes 78 for receiving the ends of the stud bolts 74, 75 so that the shifting collars 72, 62 are free to rotate with respect to each other and are not shiftable axially with respect to each other.

Integrally disposed with respect to the housing A is the stud bolt 79 upon which is swingably connected the link 80 being arranged with a pair of arms 82, 83 provided on each end respectively with the integral studs 86, 87 disposed for operative engagement with the groove 73. Included by the arm 82 is the integral stud 81 disposed for operative engagement with the groove 33 of the cam shaft 29, the groove 33 being provided with a profile suitable for shifting the shifting collar 72, and, hence, the shifting collars 62, 63 for purposes now appearing.

Such shifting of the shifting collars 62, 63 will cause the plungers 60, 61 and the plungers 65, 66 to be shifted for operative engagement alternately with either the teeth 58 or 59. For, it will be noted, rotation of the cam shaft 29 in a clockwise direction will cause the plungers 65, 66 to be shifted from engagement with the teeth 58 to a position intermediate with respect to the teeth 58, 59, while the plungers 60, 61 are being shifted for operative engagement with the teeth 58.

Further rotation of the cam shaft 29 in the clockwise direction will cause the plungers 65, 66 to be shifted for operative engagement with the teeth 59 while the plungers 60, 61 assume the position intermediate with respect to the teeth 58, 59. Further rotation of the cam shaft 29 in the clockwise direction will find the cam shaft 29 rotated one revoluion in this direction, the plungers 65, 66 will be shifted out of engagement with the teeth 59, while, at the same time the plungers 60, 61 will be shifted for operative engagement with the teeth 59. The clockwise direction of rotation of the cam shaft 29 is viewed from control wheel 31 end of the cam shaft 29.

Thus, controlling of the ratio between the drive shaft 1 and the driven shaft 49 is effected by rotation of the control wheel 31, which cause the sleeve 5 to be alternately restrained against rotation or driven by the drive shaft 1 for intervals during some of which the plungers 60, 61 or 65, 66 are alternately shifted into and out of engagement with the teeth 58 or 59 for driving engagement between one or the other of the sleeve 40, 41 and one or the other of the drums 44, 45. Such shifting of the plungers 60, 61 or 65, 66 into and out of engagement with the teeth 58, 59, it will be understood, being effected while there is substantially no movement therebetween, though, a slight amount of difference in speed might, in some instances, facilitate shifting of the shifting collars 62, 63.

(Actual speed changes between the drive shaft 1 and the driven shaft 49, however, occur responsive to speed changes of the sleeve 5. The mechanism which includes the planetary pinions 37, 38, 39, the gears 2, 42, 43 and the shifting elements connecting the sleeve 40 or 41 to the drum 44 or 45 in sequence to alternate speed variations of the sleeve 5, convert such variations of the sleeve 5 into unidirectional speed changing response between the drive shaft 1 and the driven shaft 49.)

The transmission is susceptible to many and varied applications which include installations in tractors, automobiles, trucks, and various machine tools. In these installations variations in design must be in order to get full advantage from the transmission unit, but in most cases the motor or driving spindle, as the case may be, is connected either directly or through some suitable means to the drive shaft 1, the driven shaft 49 being connected, likewise, in a suitable manner to the rear wheels of some vehicle, a tool, or some other machine.

Let it be supposed, for example, that the transmission unit is being used to drive a machine tool in an industrial application, in which case, the drive shaft 1 is connected to the motor and the driven shaft 49 is connected to tool spindle in any suitable manner. Referring to Figure 1 it will be noted that the plungers 65, 66 are in mesh with the teeth 58 of the drum 44, and the shifting collar 9 is disposed for operation of the friction member 8 for cooperation with the braking member 6. So, under these conditions the torque is transmitted from the drive shaft 1 through the gear 2 to the planetary pinions 37, 38, the sleeve 40 being connected by means of the plungers 65, 66 to the drum 44, hence, to the driven shaft 49, by means of the gears 51, 52, 53, 54.

Now, let it be supposed that it should become necessary to increase the speed of the driven shaft 49, whereupon, the control wheel 31 will be turned, necessarily, in a clockwise direction (viewing from control wheel 31 end of cam shaft 29). This clockwise direction of rotation causes the arm 22 to be oscillated until the roller 25 has been forced from the cam face 27 to the cam face 26 for shifting the shifting collar 9 for cooperation between the friction member 7 and the clutching member 3 for unison speed response of the sleeve 5 to the drive shaft 1. Such a shifting of the shifting collar 9 is effected by the time the control wheel 31 has turned one quarter revolution.

This change in speed of the sleeve 5 with respect to the drive shaft 1, will result, then, in an increase in speed of the drum 44 and, hence, the driven shaft 49, since the sleeve 40 was rotating at a speed slower than the drive shaft 1 or intermediate with respect to the sleeve 5 and the drive shaft 1, before the change in speed of the sleeve 5 occurred. The cam shaft 29 has, thus, been rotated one quarter turn with substantially no movement of the shifting collar 73 being effected by the profile of the groove 33, best seen in Figure 9.

During this interval of quarter turn of the control wheel 31, there has been effected a substantial speed change between the drive shaft 1 and the driven shaft 49. Further rotation of the control wheel 31 will cause the groove 33 to shift the shifting collar 72 for meshing engagement of the plungers 60, 61 with the teeth 58 of the drum 44, the plungers 65, 66 being shifted out of engagement with the teeth 58 at the same time. It should be noted that the sleeve 40, 41 will be rotating at the same speed, so that shifting of the plungers 60, 61 and 65, 66 in and out of engagement with the teeth 58 is effected while there is substantially no movement therebetween.

After the shifting collar 72 has been shifted for driving engagement between the sleeve 41 and the drum 44, before the roller 25 has been forced from the cam face 26 to the cam face 27, the control wheel 31 is rotated to a full half turn, the roller 25 is forced from the cam face 26 to the cam face 27, and the shifting collar 9 is again shifted for cooperation between the friction member 8 and the braking member 6 for effectively restraining the sleeve 5 against rotation. The speed of the driven shaft 49 is, thus, effectively increased, since the sleeve 41 must rotate faster than the drive shaft 1.

Because of the efficiency of the transmission care should be taken at this position of half turn of the control wheel 31 to rotate the control wheel 31 until the plungers 65, 66 are shifted into meshing engagement with the teeth 59 of the drum 45. Such a shifting of the plungers 65, 66 into meshing engagement with the teeth 59 is effected while there is substantially no movement therebetween, the span of difference in speed between the sleeves 40, 41 being equal to the difference in speed between the drums 44, 45, as has been explained.

At this position with the plungers 65, 66 in meshing engagement with the drum 45, the control wheel 31 is rotated to a full three quarters turn and the roller 25 is again forced from the cam face 27 to the cam face 26 for cooperation of the friction member 7 with the clutching member 3 and the driven shaft 49 is again effectively increased in speed.

After this position of three quarters turn of the control wheel 31 has been reached, through the interval during which the plungers 65, 66 were in meshing engagement with the teeth 59 of the drum 45, further increase in speed of the driven shaft 49 is effected by rotation of the control wheel 31, whereupon, the plungers 60, 61 will be shifted into meshing engagement with the teeth 59 of the drum 45 and further rotation of the control wheel 31 will cause the sleeve 5 to be effectively restrained against rotation by the braking member 6. This latter position of one full turn of the control wheel 31, thus reached with the sleeve 41 rotating at its maximum speed and connected to the drum 45 is the maximum speed of the driven shaft 49 possible to attain.

Thus it will be seen my invention accomplishes its object. The variable speed means which includes the braking member 6, the clutching member 3, and the friction members 7, 8 are operated repeatedly between their speed changing limits to give the desired overall speed change. The torque is to a large extent carried by gears instead of the usual friction drives which have always heretofore been required.

It will be understood that if desired, various types of variable speed means now being sold on the market could be used and substituted for the variable speed means described in these specifications, or various compounding arrangements using the principles of this variable speed transmission could be made. Likewise other changes and modifications in the form, construction, arrangement, and combination of the several parts of the variable speed transmission may be made and substituted for those herein shown and described without departing from the nature and principles of my invention.

Having thus described my invention, what I claim and desire to secure by Letters Patent is:

1. In a variable speed transmission of the kind described, in combination, a drive shaft, a driven shaft, a revolvable member mounted for independent revolution with respect to said drive and driven shafts, braking means adapted to restrain said revolvable member against rotation, clutching means disposed for clutching engagement between said revolvable member and one of said shafts, a link swingable for alternate operation of said braking and clutching means, for varying the speed of said revolvable member, said link including a pair of cam faces oppositely disposed with respect to each other, a swingable member including an arm, cam follower means splined to said swingable member against independent rotation and yieldingly held against one or the other of said pair of cam faces for operation of said link by said swingable member, a pair of revolvable members mounted for independent revolution with respect to said drive and driven shafts, a gearing arrangement adapted to connect one of said shafts and said revolvable member to said pair of revolvable members and, in a manner to reverse the direction of speed change of said pair of revolvable members with respect to each other responsive to speed changes of said revolvable member, mechanism including means shiftable for alternately connecting one or the other of said pair of revolvable members to the other of said shafts, and controlling means adapted both to actuate the arm of said swingable member for operative engagement between said cam follower means and one or the other of said cam faces for operation of said link and to operate said shiftable means.

2. In a variable speed transmission of the kind described, in combination, a drive shaft, a driven shaft, a sleeve mounted for revolution bodily about the coaxis of said drive shaft, variable speed means for varying the speed of said sleeve, first and second sleeves mounted for revolution coaxially with respect to said first named sleeve, said drive shaft and said first and second sleeves each affixed to a gear wheel respectively, first, second and third series of planetary pinions disposed for meshing engagement respectively with said gear wheels, said first, second and third series of planetary pinions being disposed for rotation of the pinions in each of said series at the same speed with respect to each other and, being carried by said first named sleeve, said second series of planetary pinions smaller than said first series of planetary pinions, said third series of planetary pinions larger than said first series of planetary pinions, mechanism including means shiftable for alternately connecting one or the other of said first and second sleeves to said driven shaft, and controlling means adapted both to regulate said variable speed means repeatedly between its speed changing limits and to operate said shiftable means.

3. In a variable speed transmission of the kind described, in combination, a drive shaft, a driven shaft, a revolvable member mounted for independent revolution with respect to said drive and driven shafts, variable speed means for varying the speed of said revolvable member, a pair of revolvable members mounted for independent revolution with respect to said drive and driven shafts, a gearing arrangement adapted to connect one of said shafts and said revolvable member to said pair of revolvable members and, in a manner to reverse the direction of speed change of said pair of revolvable members with respect to each other responsive to speed changes by said variable speed means, first and second shiftable collars connected respectively to said pair of revolvable members for rotation therewith and, being shiftable axially with respect to said pair of sleeves, a pair of drums connected to the other of said shafts for rotation at different speeds with respect to each other, each of said drums including inwardly extending sets of teeth, two sets of plungers carried by each of said shiftable collars, and yielding held in position for operative engagement with said sets of teeth, said sets of teeth adapted to force either one of said sets of plungers out of position for engagement in case of failure to mesh therewith, each of said two sets of plungers circumferentially disposed with respect to each other so that at least one of said sets of plungers will be disposed for meshing engagement with said sets of teeth and, being disposed for operative engagement with said sets of teeth in opposite directions with respect to each other, and controlling means adapted both to regulate said variable speed means repeatedly between its speed changing limits and to shift said first and second shifting collars for alternate meshing engagement between one or the other of said two sets of plungers and one or the other of said sets of teeth.

4. In a variable speed transmission of the kind described, in combination, a drive shaft, a driven shaft, a revolvable member mounted for independent revolution with respect to said drive and driven shafts, variable speed means for varying the speed of said revolvable member, a pair of revolvable members mounted for independent revolution with respect to said drive and driven shafts, a gearing arrangement adapted to connect one of said shafts and said revolvable member to said pair of revolvable members and, in a manner to reverse the direction of speed change of said pair of revolvable members with respect to each other responsive to speed changes by said variable speed means, elements connected to the other of said shafts at different speeds with respect to each other, mechanism including means shiftable for alternately connecting one or the other of said pair of revolvable members to said elements for respective intervals of operation of said elements, and controlling means adapted both to regulate said variable speed means repeatedly between its speed changing limits and to operate said shiftable means.

5. In a variable speed transmission of the kind described, in combination, a drive shaft, a driven shaft, variable speed means connected to one of said shafts, means adapted to alternate speed changes of said variable speed means, and mechanism actuable for converting alternate speed changes of said variable speed means into unidirectional speed changing response between said drive and driven shafts, said mechanism including a pair of revolvable members mounted for independent revolution with respect to said drive and driven shafts, a gearing arrangement adapted to connect said variable speed means to said revolvable members and, in a manner to reverse the direction of speed change of said pair of revolvable members with respect to each other responsive to said variable speed means, members connected to the other of said shafts for rotation at different speeds with respect to each other, mechanism including means shiftable for alternate driving engagement between one or the other of said pair of revolvable members and any one of said last named members, and means for actuation of said shiftable means.

6. In a variable speed transmission of the kind described, in combination, a drive shaft, a driven shaft, variable speed means, a pair of revolvable members mounted for independent revolution with respect to said drive and driven shafts, a gearing arrangement adapted to connect one of said shafts to said pair of revolvable members at speeds determined by said variable speed means and, in a manner to reverse the direction of speed change of said pair of revolvable members with respect to each other responsive to said variable speed means, members connected to the other of said shafts for rotation at different speeds with respect to each other, mechanism including means shiftable for alternate driving engagement between one or the other of said pair of revolvable members and any one of said last named members, and controlling means adapted both to regulate the speed of said variable speed means repeatedly between its speed changing limits and to actuate said shiftable means.

7. In a variable speed transmission of the kind described, in combination, a drive shaft, a driven shaft, variable speed means, means actuable for affecting alternate speed changes of said variable speed means, mechanism adapted to convert alternate speed changes of said variable speed means into unidirectional speed changing response between said drive and driven shafts, said mechanism including a pair of revolvable members connected to one of said shafts at speeds determined by said variable speed means and, for response to said variable speed means in opposite directions with respect to each other, and means shiftable for alternate driving engagement between one or the other of said revolvable members and the other of said shafts, and controlling means adapted both to actuate said actuable means and to shift said shiftable means.

VERNON KINSER.